(12) United States Patent
Du et al.

(10) Patent No.: US 12,117,578 B2
(45) Date of Patent: Oct. 15, 2024

(54) ELASTIC WAVE STRESS TENSOR DOUBLE-DOT PRODUCT SEISMIC IMAGING METHOD AND DEVICE

(71) Applicant: China University of Petroleum (East China), Qingdao (CN)

(72) Inventors: Qizhen Du, Shandong (CN); Fuyuan Zhang, Shandong (CN); Li-Yun Fu, Shandong (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/492,288

(22) Filed: Oct. 23, 2023

(65) Prior Publication Data
US 2024/0184005 A1    Jun. 6, 2024

(30) Foreign Application Priority Data
Oct. 21, 2022   (CN) .......................... 202211292308.9

(51) Int. Cl.
G01V 1/30         (2006.01)
(52) U.S. Cl.
CPC .......... G01V 1/307 (2013.01); *G01V 2210/74* (2013.01)
(58) Field of Classification Search
CPC ........ G01V 1/307; G01V 1/301; G01V 1/303; G01V 1/305; G01V 20/00; G01V 2210/74;
(Continued)

(56) References Cited

U.S. PATENT DOCUMENTS 10,241,222 B2 * 3/2019 Jiang ....................... G06F 30/20
2003/0072130 A1 * 4/2003 Tsang .................... G06F 30/367
361/728
(Continued)

FOREIGN PATENT DOCUMENTS

CN         105759310 B     5/2018
WO    WO-2016108896 A1 *  7/2016  ............. G01V 1/282

OTHER PUBLICATIONS

Shabelansky, Theory and application of source independent full wave (Year: 2015).*
(Continued)

*Primary Examiner* — Daniel L Murphy
*Assistant Examiner* — Amie M Ndure
(74) *Attorney, Agent, or Firm* — Ruggiero McAllister & McMahon LLC (57) ABSTRACT

The embodiment of the disclosure relates to an elastic wave stress tensor double-dot product seismic imaging method and device. The method comprises: obtaining a decoupled particle vibration velocity vector wavefield by utilizing the existing decoupled wave equation method for the receiver wavefield; then obtaining a decoupled pseudo-stress wavefield by constructing the decoupled pseudo-stress equation by using the obtained decoupled particle vibration velocity vector wavefield; and finally computing a source second-order stress tensor wavefield and the decoupled receiver second-order stress tensor wavefield by using the double-dot product cross-correlation imaging condition algorithm, to obtain the final scalar imaging results. With the embodiment of the present disclosure, the combined P-wave and S-wave stress exploration can be realized, therefore, the obtained imaging results can be used to accurately predict the risk of gas exploration.

8 Claims, 9 Drawing Sheets

(58) Field of Classification Search
CPC ........... G01V 2210/72; G01V 2210/70; G01V 2210/63; G01V 2210/632; G01V 2210/64; G01V 2210/65; G01V 2210/66; G01V 2210/67
USPC .......................................................... 367/38
See application file for complete search history.

(56) References Cited

U.S. PATENT DOCUMENTS

| | | | |
|---|---|---|---|
| 2011/0153290 A1* | 6/2011 | Hu ........................... | G06F 17/10 703/2 |
| 2012/0263015 A1* | 10/2012 | Zhang ..................... | G01V 1/30 367/38 |
| 2013/0060544 A1* | 3/2013 | Bakker .................... | G01V 1/28 703/2 |
| 2020/0233112 A1* | 7/2020 | Zhao ....................... | G01V 1/362 |

OTHER PUBLICATIONS

Gassmann, on Elasticity of porous media (Year: 1998).*
Jean Virieux, (1986), "P-SV wave propagation in heterogeneous media: Velocity-stress finite-difference method," Geophysics 51: 889-901.
R. E. Sheriff, L. P. Geldart. Exploration Seismology[M]. Cambridge University Press. Aug. 25, 1995.
Wen-Fong Chang and George A. McMechan. 3-D elastic prestack, reverse-time depth migration. Geophysics, 1994, 59(4): 597-609.
Wenlong Wang, George A. McMechan, Chen Tang, and Fei Xie. Up/down and P/S decompositions of elastic wavefields using complex seismic traces with applications to calculating Poynting vectors and angle-domain common-image gathers from reverse time migrations. Geophysics, 2016, 81(4): S181-S194. 10.1190/GEO2015-0456.1.

* cited by examiner

FIG. 1

(a) staggered grid

FIG. 2a (b) cell grid definition

ELASTIC WAVE STRESS TENSOR DOUBLE-DOT PRODUCT SEISMIC IMAGING METHOD AND DEVICE

CROSS-REFERENCE TO RELATED APPLICATIONS

This application claims priority to Chinese Patent Application No. 202211292308.9, filed Oct. 21, 2022, which is hereby incorporated by reference in its entirety.

TECHNICAL FIELD

The present disclosure relates to the field of exploration geophysics, in particular to an elastic wave stress tensor double-dot product seismic imaging method and device.

BACKGROUND

In the current elastic reverse time migration imaging technology, the commonly used separation technique of structural decoupled wave equation can not obtain the shear wave stress without crosstalk. In addition, the stress field is essentially a second-order tensor, but the existing imaging conditions of scalar or vector correlation cannot be directly applied to the second-order stress tensor wavefield. The traditional stress imaging technology is mostly single P-wave component imaging technology, which cannot exert the advantage of combined P-wave and S-wave exploration, thereby resulting in poor imaging quality and an inability to accurately use the imaging results to predict the risks of oil and gas exploration.

There is an urgent need for an elastic wave stress tensor double-dot product seismic imaging method, so as to solve the problem that the existing P-wave imaging technology can not exert the advantages of combined P-wave and S-wave exploration, resulting in the inability to accurately use the multi-wave imaging results to predict the risks of oil and gas exploration.

SUMMARY

In order to solve the above technical problems, the specific technical solutions of the embodiments in the present disclosure are as follows;

In one aspect, an embodiment of that present disclosure provides an elastic wave stress tensor double-dot product seismic imaging method, comprising:

based on a first order velocity-stress equation of an elastic isotropic medium, medium model parameters, a function of source wavelet and multi-component seismic records are taken as inputs, to solve the first order velocity-stress equation of an elastic isotropic medium by a staggered grid high-order finite difference method, thereby obtaining a source stress tensor wavefield and a receiver particle vibration velocity vector wavefield;

constructing a decoupled wave equation by using the receiver particle vibration velocity vector wavefield to obtain a decoupled receiver P-wave particle vibration velocity vector wavefield and a decoupled receiver S-wave particle vibration velocity vector wavefield;

constructing a decoupled pseudo-stress equation by using the decoupled receiver P-wave particle vibration velocity vector wavefield and the decoupled receiver S-wave particle vibration velocity vector wavefield to obtain a receiver decoupled pseudo-stress tensor wavefield;

the source stress tensor wavefield and the receiver decoupled pseudo-stress tensor wavefield are calculated by using a double-dot product cross-correlation imaging condition algorithm to obtain a pseudo PP scalar imaging result and a pseudo PS scalar imaging result, and taking the pseudo PP scalar imaging result and the pseudo PS scalar imaging result as elastic wave stress tensor double-dot product seismic imaging results.

In another aspect, the embodiment of the present disclosure further provides a computer device comprising a memory, a processor and a computer program stored on the memory, the processor implementing the method described above when executing the computer program.

In another aspect, the embodiment of the present disclosure further provides a computer storage medium storing a computer program therein, that, when run by a processor of a computer device, performs the method described above.

In the embodiment of the specification, by utilizing the existing decoupled wave equation method to calculate the receiver wavefield, the decoupled particle vibration velocity vector wavefield is obtained, then use the obtained decoupled particle vibration velocity vector wavefield to construct a decoupled pseudo-stress equation, calculate the decoupled pseudo-stress equation to obtain a decoupled pseudo-stress wavefield, and finally a source second-order stress tensor wavefield and the decoupled receiver second-order stress tensor wavefield are computed by using the double-dot product cross-correlation imaging condition algorithm, to obtain the final scalar imaging results. In the embodiment of the present specification, the stress imaging results include both the P-wave stress imaging result and the S-wave stress imaging result, so that the combined P-wave and S-wave stress exploration can be realized, therefore, the obtained imaging results can be used to accurately predict the risk of gas exploration, so as to solve the problem that the existing P-wave imaging technology can not exert the advantage of combined P-wave and S-wave exploration, resulting in the inability to accurately use the multi-wave imaging results to predict the risks of oil and gas exploration.

BRIEF DESCRIPTION OF DRAWINGS

In order to more clearly explain the embodiment of the present disclosure or the technical solution in the prior art, the accompanying drawings used in the description of the embodiment or the prior art will be briefly described below.

DESCRIPTION OF THE REFERENCE NUMERALS

1001. first order velocity-stress equation solving unit;
1002. decoupled wave equation solving unit;
1003. decoupled pseudo-stress equation solving unit;
1004. imaging result computing unit;
1102. computer device;
1104. processing device;
1106. memory resource;
1108. driving mechanism;
1110. input/output module;
1112. input device;
1114. output device;
1116. presentation device;
1118. graphical user interface;
1120. network interface;
1122. communication link;
1124. communication bus.

DETAILED DESCRIPTION

Figure 1:
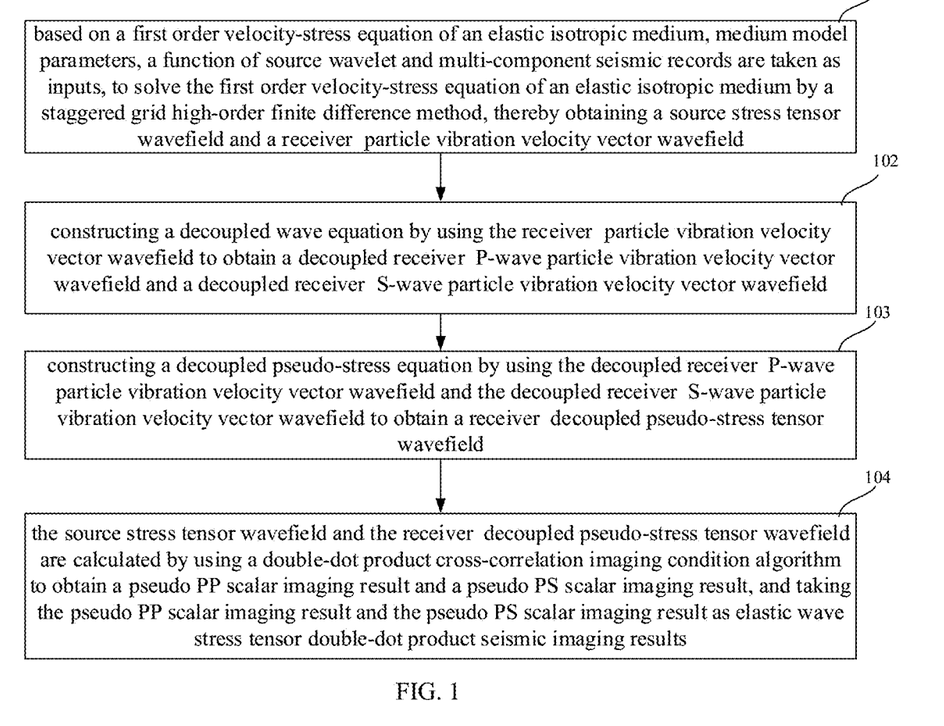
FIG. 1 is a flow schematic diagram of an elastic wave stress tensor double-dot product seismic imaging method according to an embodiment of the present specification.

In order to solve the problems existing in the prior art, an embodiment of that present disclosure provides an elastic wave stress tensor double-dot product seismic imaging method, which can obtain a decoupled stress wavefield, and in the corresponding imaging conditions, each part of the energy in the stress tensor wavefield is taken into account, and the scalar imaging results can be obtained by a relatively simple calculation procedure. FIG. 1 is a flow schematic diagram of an elastic wave stress tensor double-dot product seismic imaging method according to an embodiment of the present specification. The process of imaging based on seismic stress is described in this figure. Specifically, as shown in FIG. 1, the method can be executed by a processor, and may comprise:

a step 101: based on a first order velocity-stress equation of an elastic isotropic medium, medium model parameters, a function of source wavelet and multi-component seismic records are taken as inputs, to solve the first order velocity-stress equation of an elastic isotropic medium by a staggered grid high-order finite difference method, thereby obtaining a source stress tensor wavefield and a receiver particle vibration velocity vector wavefield:

a step 102: constructing a decoupled wave equation by using the receiver particle vibration velocity vector wavefield to obtain a decoupled receiver P-wave particle vibration velocity vector wavefield and a decoupled receiver S-wave particle vibration velocity vector wavefield;

a step 103: constructing a decoupled pseudo-stress equation by using the decoupled receiver P-wave particle vibration velocity vector wavefield and the decoupled receiver S-wave particle vibration velocity vector wavefield to obtain a receiver decoupled pseudo-stress tensor wavefield;

a step 104: the source stress tensor wavefield and the receiver decoupled pseudo-stress tensor wavefield are calculated by using a double-dot product cross-correlation imaging condition algorithm to obtain a pseudo PP scalar imaging result and a pseudo PS scalar imaging result, and taking the pseudo PP scalar imaging result and the pseudo PS scalar imaging result as elastic wave stress tensor double-dot product seismic imaging results.

In the embodiment of the specification, by utilizing the existing decoupled wave equation method to calculate the receiver wavefield, the decoupled particle vibration velocity vector wavefield is obtained, then use the obtained decoupled particle vibration velocity vector wavefield to construct a decoupled pseudo-stress equation, calculate the decoupled pseudo-stress equation to obtain a decoupled pseudo-stress wavefield, and finally a source second-order stress tensor wavefield and the decoupled receiver second-order stress tensor wavefield are computed by using the double-dot product cross-correlation imaging condition algorithm, to obtain the final scalar imaging results. In the embodiment of the present specification, the stress imaging results include both the P-wave stress imaging result and the S-wave stress imaging result, so that the combined P-wave and S-wave stress exploration can be realized, therefore, the obtained imaging results can be used to accurately predict the risk of gas exploration, so as to solve the problem that the existing P-wave imaging technology can not exert the advantage of combined P-wave and S-wave exploration, resulting in the inability to accurately use the multi-wave imaging results to predict the risks of oil and gas exploration.

Figure 2A:
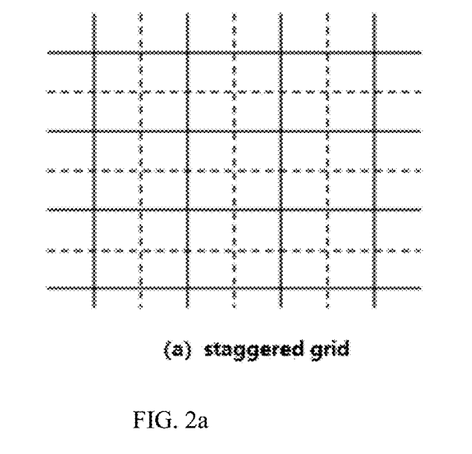
FIGS. 2a and 2b are schematic diagrams illustrating the definition of a staggered grid according to an embodiment of the present specification.
Figure 2B:
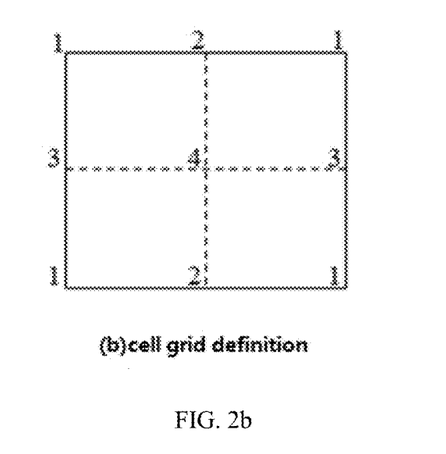

The elastic wave stress tensor double-dot product seismic imaging method described in the embodiment of the present disclosure comprises:

Step 1: based on a first order velocity-stress equation of an elastic isotropic medium, medium model parameters, a source function of wavelet and multi-component seismic records are taken as inputs, to solve the first order velocity-stress equation by a staggered grid high-order finite difference method, thereby obtaining a source stress tensor wavefield and a receiver particle vibration velocity vector wavefield;

the first order velocity-stress equation of an elastic isotropic medium is given by the formula (1):

$$\begin{cases} \dfrac{\partial \tau_{xx}}{\partial t} = (\lambda + 2\mu)\dfrac{\partial v_x}{\partial x} + \lambda\dfrac{\partial v_z}{\partial z} \\ \dfrac{\partial \tau_{zz}}{\partial t} = \lambda\dfrac{\partial v_x}{\partial x} + (\lambda + 2\mu)\dfrac{\partial v_z}{\partial z} \\ \dfrac{\partial \tau_{xz}}{\partial t} = \mu\dfrac{\partial v_z}{\partial x} + \mu\dfrac{\partial v_x}{\partial z} \\ \rho\dfrac{\partial v_x}{\partial t} = \dfrac{\partial \tau_{xx}}{\partial x} + \dfrac{\partial \tau_{xz}}{\partial z} \\ \rho\dfrac{\partial v_z}{\partial t} = \dfrac{\partial \tau_{xz}}{\partial x} + \dfrac{\partial \tau_{zz}}{\partial z} \end{cases} \quad (1)$$

wherein ($\tau_{xx}$, $\tau_{zz}$, $\tau_{xz}$) denotes the source stress tensor wavefield, ($v_x$, $v_z$) denotes the receiver particle vibration velocity vector wavefield, $\lambda$ and $\mu$ denote Lame's parameters, $\rho$ denotes density; t denotes time; x and z denote x and z directions of a two-dimensional Cartesian coordinate system respectively;

the definition of the staggered grid is shown in FIGS. 2a and 2b, FIG. 2a is a schematic diagram of the entire spatial grid, FIG. 2b shows cell grid definition, in which the full grid is represented by solid lines and the half grid by dashed lines, and the source stress tensor wavefield ($\tau_{xx}$, $\tau_{zz}$, $\tau_{xz}$) and the receiver particle vibration velocity vector wavefield are defined according to the four different spatial relative positions 1, 2, 3 and 4 in FIG. 2b, as shown in the formula (2):

$$(1{:}v_x; 2{:}\tau_{xx}, \tau_{zz}; 3{:}\tau_{xz}; 4{:}v_z) \quad (2)$$

Based on the above definition of the grid points, the staggered grid high-order finite difference method is used to discretize the first order velocity-stress equation of an elastic isotropic medium, and a discrete scheme is given as formula (3):

$$v_{x_{i+\frac{1}{2},k}}^{n+\frac{1}{2}} = v_{x_{i+\frac{1}{2},k}}^{n-\frac{1}{2}} + \rho^{-1} \cdot \Delta t \cdot F_x \tau_{xx_{i,k}}^n + \rho^{-1} \cdot \Delta t \cdot B_z \tau_{xz_{i+\frac{1}{2},k+\frac{1}{2}}}^n \quad (3)$$

$$v_{z_{i,k+\frac{1}{2}}}^{n+\frac{1}{2}} = v_{z_{i,k+\frac{1}{2}}}^{n-\frac{1}{2}} + \rho^{-1} \cdot \Delta t \cdot B_x \tau_{xz_{i+\frac{1}{2},k+12}}^n + \rho^{-1} \cdot \Delta t \cdot F_x \tau_{zz_{i,k}}^n$$

$$\tau_{xx_{i,k}}^n = \tau_{xx_{i,k}}^{n-1} + \Delta t(\lambda + 2\mu) B_x v_{x_{i+\frac{1}{2},k}}^{n+\frac{1}{2}} + \Delta t \lambda B_z v_{z_{i,k+\frac{1}{2}}}^{n+\frac{1}{2}}$$

$$\tau_{zz_{i,k}}^n = \tau_{zz_{i,k}}^{n-1} + \Delta t \cdot \lambda \cdot B_x v_{x_{i+\frac{1}{2},k}}^{n+\frac{1}{2}} + \Delta t \cdot (\lambda + 2\mu) B_z v_{z_{i,k+\frac{1}{2}}}^{n+\frac{1}{2}}$$

$$\tau_{xz_{i+\frac{1}{2},k+\frac{1}{2}}}^n = \tau_{xz_{i+\frac{1}{2},k+\frac{1}{2}}}^{n-1} + \Delta t \cdot \mu F_x v_{z_{i,k+\frac{1}{2}}}^{n+\frac{1}{2}} + \Delta t \cdot \mu F_z v_{x_{i+\frac{1}{2},k}}^{n+\frac{1}{2}}$$

in the discretization format, $\Delta t$ denotes time interval, i and k denote discrete points in the x and z directions in the two-dimensional Cartesian coordinate system respectively, n denotes discrete point in the direction of time t, $\rho^{-1}$ denotes the −1 power of the density $\rho$, $F_s$(s=x,z) and $B_s$(s=x,z) denote a forward difference operator and a backward difference operator in x, z directions respectively, and the specific expression is formula (4):

$$F_x f_{i,k} = \dfrac{1}{\Delta x} \sum_{m=1}^{M} c_m^{(M)} [f_{i+m,k} - f_{i-m+1,k}], \quad (4)$$

$$B_x f_{i,k} = \dfrac{1}{\Delta x} \sum_{m=1}^{M} c_m^{(M)} [f_{i+m-1,k} - f_{i-m,k}],$$

-continued $$F_z f_{i,k} = \dfrac{1}{\Delta z} \sum_{m=1}^{M} c_m^{(M)} [f_{i,k+m} - f_{i,k-m+1}],$$

$$B_z f_{i,k} = \dfrac{1}{\Delta z} \sum_{m=1}^{M} c_m^{(M)} [f_{i,k+m-1} - f_{i,k-m}].$$

wherein $\Delta x$ and $\Delta z$ denote sampling intervals in x and z directions respectively, $f_{i,k}$ denotes a wavefield quantity acted by difference operator, i and k denote the discrete points and are used for determining the spatial location of the wavefield quantity, $C_m^{(M)}$ denotes finite difference coefficients of the 2M-order staggered grid, 2M denotes difference order, and M denotes a positive integer;

the Lame's parameters $\lambda$ and $\mu$, and the density $\rho$ are obtained according to the given medium model parameters by using the above discrete scheme; during extension process of a source wavefield, the P-wave source in the form of a Ricker wavelet is loaded on ($\tau_{xx}$, $\tau_{zz}$) of the source stress tensor wavefield in the formula (3), the particle vibration velocity component ($v_x$, $v_z$) and the particle stress tensor wavefield ($\tau_{xx}$, $\tau_{zz}$, $\tau_{xz}$) in the formula (3) are iteratively updated, and the source stress tensor wavefield ($\tau_{xx}$, $\tau_{zz}$, $\tau_{xz}$) is obtained by calculation; during extension process of the receiver wavefield, multi-component seismic records is loaded on the receiver particle vibration velocity vector wavefield ($v_x$, $v_z$), and the particle stress tensor wavefield ($\tau_{xx}$, $\tau_{zz}$, $\tau_{xz}$) and the particle vibration velocity component ($v_x$, $v_z$) in the formula (3) are iteratively updated, and the receiver particle vibration velocity vector wavefield ($v_x$, $v_z$) is obtained by calculation.

Step 2: using the receiver particle vibration velocity vector wavefield ($v_x$, $v_z$) to construct the auxiliary P-wave stress as shown in the formula (5):

$$\dfrac{\partial \tau^P}{\partial t} = (\lambda + 2\mu)\left(\dfrac{\partial v_x}{\partial x} + \dfrac{\partial v_z}{\partial z}\right) \quad (5)$$

wherein $\tau^P$ denotes the auxiliary P-wave stress. By solving the formula (5), the decoupled receiver P-wave particle vibration velocity vector wavefield and the decoupled receiver S-wave particle vibration velocity vector wavefield can be obtained.

Wherein, the decoupled receiver P-wave particle vibration velocity vector wavefield is represented by formula (6):

$$\begin{cases} \rho \dfrac{\partial v_x^P}{\partial t} = \dfrac{\partial \tau^P}{\partial x} \\ \rho \dfrac{\partial v_z^P}{\partial t} = \dfrac{\partial \tau^P}{\partial z} \end{cases} \quad (6)$$

Wherein, ($v_x^P$, $v_z^P$) denotes the decoupled receiver P-wave particle vibration velocity vector wavefield;

the decoupled receiver S-wave particle vibration velocity vector wavefield is represented by formula (7):

$$\begin{cases} v_x^S = v_x - v_x^P \\ v_z^S = v_z - v_z^P \end{cases} \quad (7)$$

Wherein, $(v_x^S, v_z^S)$ denotes the decoupled receiver S-wave particle vibration velocity vector wavefield.

Step 3: constructing a decoupled pseudo-stress equation by using the decoupled receiver P-wave particle vibration velocity vector wavefield and the decoupled receiver S-wave particle vibration velocity vector wavefield to obtain a receiver decoupled pseudo-stress tensor wavefield;

the P-wave pseudo-stress equation is given by the formula (8):

$$\frac{\partial \tau_{qp,ij}}{\partial t} = \lambda v_{k,k}^P \delta_{ij} + 2\mu v_{i,j}^P \tag{8}$$

Equation (8) is expanded into equation (9):

$$\begin{cases} \frac{\partial \tau_{xx}^{qP}}{\partial t} = (\lambda + 2\mu)\left(\frac{\partial v_x^P}{\partial x} + \frac{\partial v_z^P}{\partial z}\right) - 2\mu \frac{\partial v_z^P}{\partial z} \\ \frac{\partial \tau_{zz}^{qP}}{\partial t} = (\lambda + 2\mu)\left(\frac{\partial v_x^P}{\partial x} + \frac{\partial v_z^P}{\partial z}\right) - 2\mu \frac{\partial v_x^P}{\partial x} \\ \frac{\partial \tau_{xz}^{qP}}{\partial t} = \mu\left(\frac{\partial v_x^P}{\partial z} + \frac{\partial v_z^P}{\partial x}\right) \end{cases} \tag{9}$$

the S-wave pseudo-stress equation is given by the formula (10):

$$\frac{\partial \tau_{qs,ij}}{\partial t} = 2\mu v_{i,j}^S \tag{10}$$

Equation (10) is expanded into equation (11):

$$\begin{cases} \frac{\partial \tau_{xx}^{qS}}{\partial t} = -2\mu \frac{\partial v_z^S}{\partial z} \\ \frac{\partial \tau_{zz}^{qS}}{\partial t} = -2\mu \frac{\partial v_z^S}{\partial x} \\ \frac{\partial \tau_{xz}^{qS}}{\partial t} = \mu\left(\frac{\partial v_x^S}{\partial z} + \frac{\partial v_z^S}{\partial x}\right) \end{cases} \tag{11}$$

In the formulas (8) to (11), $(\tau_{xx}^{qP}, \tau_{zz}^{qP}, \tau_{xz}^{qP})$ denotes the P-wave pseudo stress, $(\tau_{xx}^{qS}, \tau_{zz}^{qS}, \tau_{xz}^{qS})$ denotes the S-wave pseudo stress, $\delta_g$ denotes Kronecker function.

The decoupled receiver P-wave particle vibration velocity vector wavefield $(v_x^P, v_z^P)$ and the decoupled receiver S-wave particle vibration velocity vector wavefield $(v_x^S, v_z^S)$ are substituted into the P-wave pseudo-stress equation and the S-wave pseudo-stress equation respectively to obtain the receiver decoupled pseudo-stress tensor wavefield Rcv, wherein the receiver decoupled pseudo-stress tensor wavefield includes a receiver P-wave decoupled pseudo-stress tensor wavefield $Rcv^P = (\tau_{xx}^{qP}, \tau_{zz}^{qP}, \tau_{xz}^{qP})$ and a receiver S-wave decoupled pseudo-stress tensor wavefield $Rcv^S = (\tau_{xx}^{qS}, \tau_{zz}^{qS}, \tau_{xz}^{qS})$.

Step 4: the source stress tensor wavefield $Src = (\tau_{xx}, \tau_{zz}, \tau_{xz})$ and the receiver decoupled pseudo-stress tensor wavefield Rev are calculated by using a double-dot product cross-correlation imaging condition algorithm, as shown in the formula (12):

$$\begin{cases} I_{qPP} = \int_0^{t_{max}} Src(x, t) : Rcv^P(x, t)dt \\ I_{qPS} = \int_0^{t_{max}} Src(x, t) : Rcv^S(x, t)dt \end{cases} \tag{12}$$

wherein $I_{qPP}$ denotes the pseudo PP scalar imaging result, $I_{qPS}$ denotes the pseudo PS scalar imaging result, the position vector x denotes spatial position coordinates (x, z) of the calculation node in the two-dimensional Cartesian coordinate system, t denotes time, : denotes the double-dot product operation symbol; the operation is expanded using the double-dot product algorithm as shown in the formula (13):

$$\begin{cases} I_{qPP} = \int_0^{t_{max}} \left( Src_{\sigma_{xx}}(x,t) Rcv_{\tau_{xx}^{qP}}^P(x,t) + Src_{\sigma_{zz}}(x,t) Rcv_{\tau_{zz}^{qP}}^P(x,t) + 2Src_{\sigma_{xz}}(x,t) Rcv_{\tau_{xz}^{qP}}^P(x,t) \right) dt \\ I_{qPS} = \int_0^{t_{max}} \left( Src_{\sigma_{xx}}(x,t) Rcv_{\tau_{xx}^{qS}}^S(x,t) + Src_{\sigma_{zz}}(x,t) Rcv_{\tau_{zz}^{qS}}^S(x,t) + 2Src_{\sigma_{xz}}(x,t) Rcv_{\tau_{xz}^{qS}}^S(x,t) \right) dt \end{cases} \tag{13}$$

wherein Src and Rev denote corresponding component forms of the source stress tensor wavefield Src and the receiver decoupled pseudo-stress tensor wavefield Rev respectively, $Src_{\sigma_{xx}}$, $Src_{\sigma_{zz}}$, $Src_{\sigma_{xz}}$ denote xx, zz, xz components of the source stress tensor respectively, $$Rcv_{\tau_{xx}^{qP}}^P, Rcv_{\tau_{zz}^{qP}}^P, Rcv_{\tau_{xz}^{qP}}^P$$

denote xx, zz, xz components of the receiver decoupled P-wave pseudo stress tensor respectively, $$Rcv_{\tau_{xx}^{qS}}^S, Rcv_{\tau_{zz}^{qS}}^S, Rcv_{\tau_{xz}^{qS}}^S$$

denote xx, zz, xz components of the receiver decoupled S-wave pseudo stress tensor respectively. The pseudo PP scalar imaging result $I_{qPP}$ and the pseudo PS scalar imaging result $I_{qPS}$ are taken as the elastic wave stress tensor double-dot product seismic imaging results. It should be noted that the pseudo PP imaging result $I_{qPP}$ and the pseudo PS imaging result $I_{qPS}$ are different from the conventional PP and PS imaging results, which is mainly represented in that the conventional imaging results mostly utilize the particle vibration velocity vector or the displacement field for imaging, and $I_{qPP}$ and $I_{qPS}$ use the elastic stress wavefield satisfying the tensor form to perform imaging.

In the embodiment of the specification, a second-order tensor decoupled stress wavefield corresponding to the total stress wavefield can be obtained, the second-order stress tensor wavefield can be directly used to obtain the scalar imaging result by using the double-dot product cross-correlation imaging condition, and the physical meaning is more definite, and the imaging condition fully considers each component of tensor wavefield, and realizes the stress imaging of elastic reverse time migration, which provides an additional choice for elastic reverse time migration algorithm.

Figure 3:
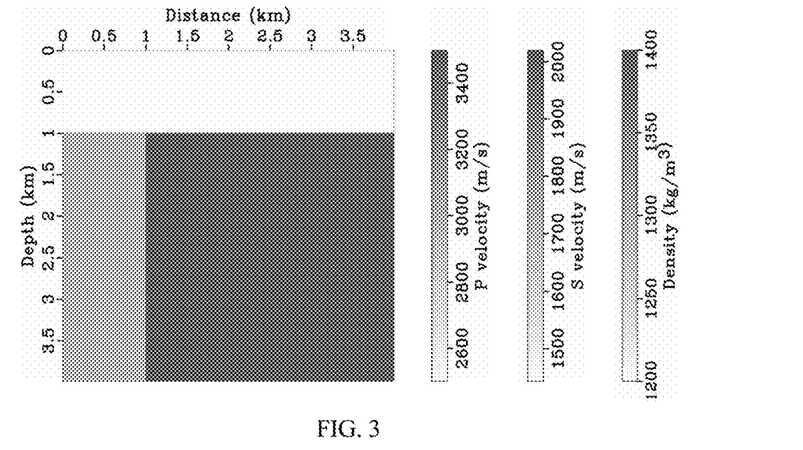
FIG. 3 is a schematic diagram of specific parameters of a horizontal-vertical interface elastic model according to an embodiment of the present disclosure.
Figure 4A:
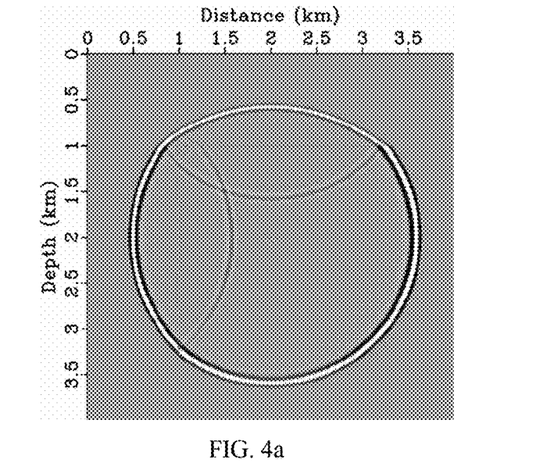
FIGS. 4a, 4b and 4c show wavefield snapshots at 450 ms for forward decoupling of the P-wave pseudo stress of the model shown in FIGS. 2a and 2b according to an embodiment of the present specification.
Figure 4B:
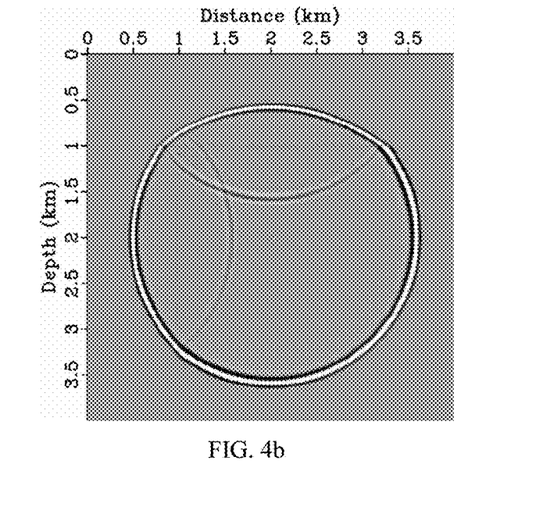
Figure 4C:
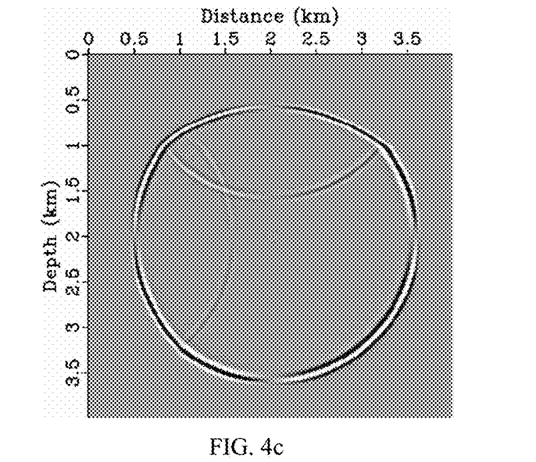
Figure 5A:
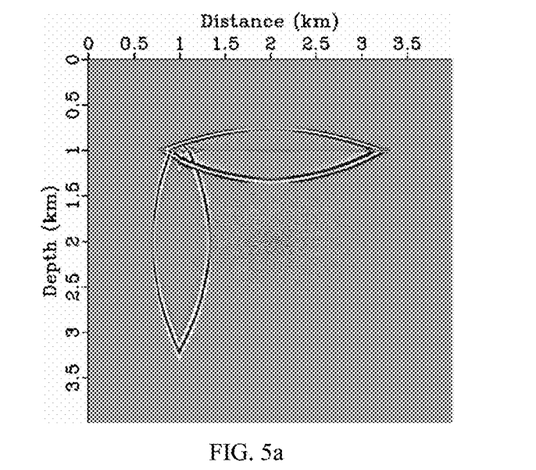
FIGS. 5a, 5b and 5c show wavefield snapshots at 450 ms for forward decoupling of the S-wave pseudo stress of the model shown in FIGS. 2a and 2b according to an embodiment of the present specification.
Figure 5B:
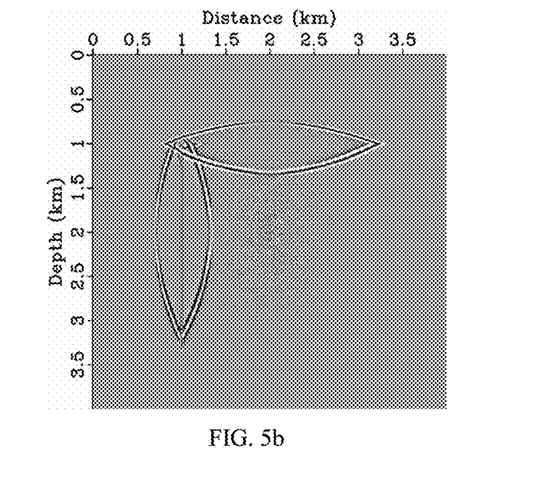
Figure 5C:
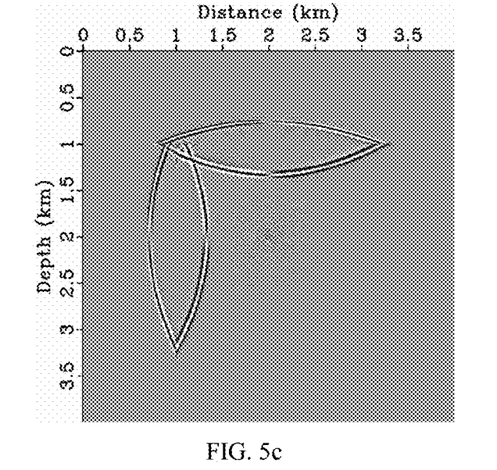

Illustratively, an disclosure of the stress wavefield decoupling method of an elastic model having a horizontal-vertical interface is described in connection with an embodiment of the present specification, the model and its parameters are shown in FIG. 3, in which the abscissa "Distance" denotes the model width, the ordinate "Depth" denotes the model depth in the unit of km, a, b and c in FIG. 3 denote the P-wave velocity, the S-wave velocity, and the density respectively. The wavefield is simulated by using pure P wave excited by a 30 Hz dominant frequency Ricker wavelet source function as an input, and the receiver particle vibration velocity vector wavefield is obtained by applying step 1 of the embodiment of the specification, then the decoupled receiver P-wave particle vibration velocity vector wavefield and the decoupled receiver S-wave particle vibration velocity vector wavefield are obtained by applying the decoupled wave equation in the step 2 in the embodiment of the present specification, and next the decoupled P-wave and S-wave pseudo stresses are obtained by applying the pseudo-stress decoupled equation in the step 3 of the embodiment of the present specification, and the results of the decoupled receiver P-wave pseudo stress are shown in FIGS. 4a, 4b and 4c, the results of the decoupled receiver S-wave pseudo stress are shown in FIGS. 5a, 5b and 5c. In FIGS. 4a, 4b, 4c and FIGS. 5a, 5b and 5c, the abscissa "Distance" denotes the model width, and the ordinate "Depth" denotes the model depth in the unit of km. It can be seen from FIGS. 4a, 4b, 4c and 5a, 5b, 5c that the transmission, reflection P-wave and conversion transmission, conversion reflection S-wave are decoupled successfully at the interface, therefore, it can be shown that the stress decoupling method of the embodiment in this disclosure is correct and effective.

Figure 6A:
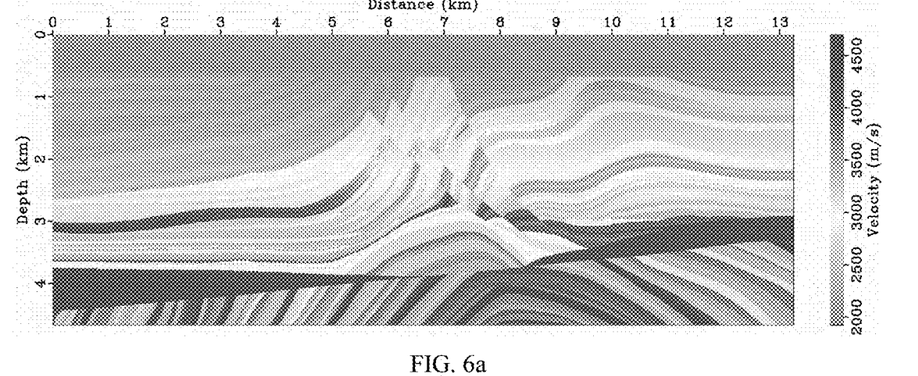
FIGS. 6*a*, 6*b* and 6*c* show the Marmousi2 model after resampling according to the embodiment of the present specification.
Figure 6B:
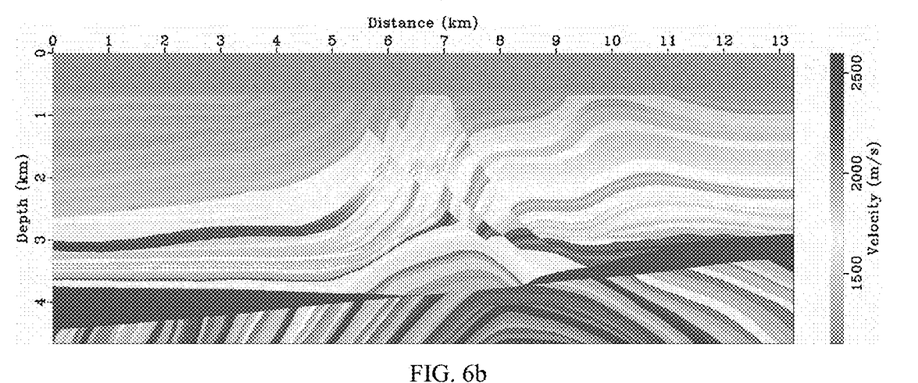
Figure 6C:
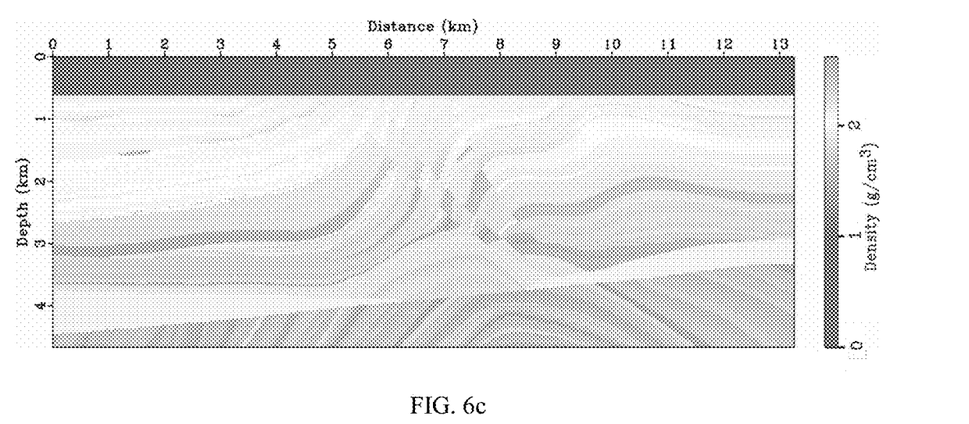

In order to verify the applicability of the double-dot product cross-correlation imaging condition method of the embodiment of the disclosure in a complex model, the stress decoupling and imaging conditions of the embodiment of this disclosure are used in the elastic wave imaging experiment of the Marmousi2 model after resampling, and the model speed is shown in FIGS. 6a, 6b and 6c, in which FIG. 6a shows the Marmousi2 model P-wave velocity model, FIG. 6b shows the Marmousi2 model P-wave velocity model, FIG. 6c shows a S-wave velocity model and a density model.

Hereinafter, a certain shot imaging is taken as an example to explain the migration imaging process by applying the embodiment of the specification.

Figure 7A:
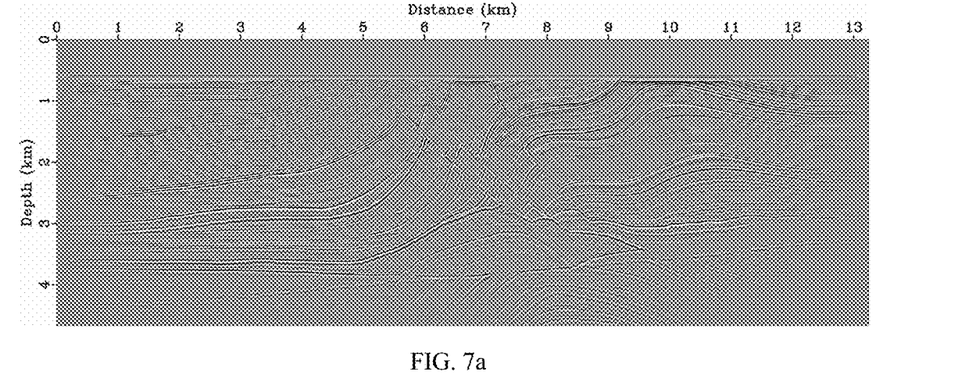
FIGS. 7*a* and 7*b* show the results of offset imaging shown in FIGS. 5*a*, 5*b* and 5*c* according to an embodiment of the present specification.
Figure 7B:
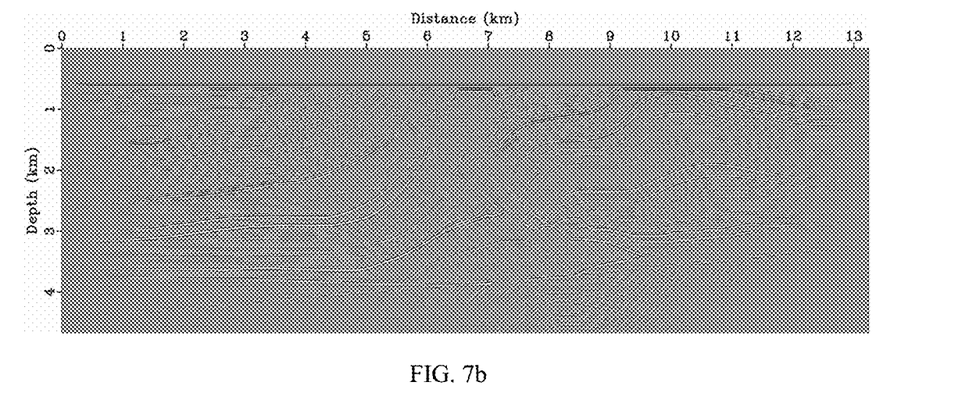

The source wavefield is extrapolated forward with the source function as the input, and the receiver wavefield is extrapolated backward with the unseparated multi-component seismic data as the input to obtain the elastic wavefield at each time. For the receiver wavefield, the receiver particle vibration velocity vector wavefield is obtained by applying step 1 of the embodiment of the specification, then the decoupled receiver P-wave particle vibration velocity vector wavefield and the decoupled receiver S-wave particle vibration velocity vector wavefield are obtained by applying the decoupled wave equation in the step 2 in the embodiment of the present specification; and next the decoupled P-wave and S-wave pseudo stresses are obtained by applying the pseudo-stress decoupled equation in the step 3 of the embodiment of the present specification; in combination with the source stress wavefield and the receiver decoupled pseudo stress wavefield, the double-dot product cross-correlation imaging condition in the step 4 is applied to obtain the scalar imaging result. A single shot imaging result is obtained by applying the above procedure, and the final multi-shot stacking result is as shown in FIGS. 7a and 7b, in which FIG. 7a denotes the scalar pseudo PP imaging result $I_{qPP}$, FIG. 7b denotes the scalar pseudo PS imaging result $I_{qPS}$. Compared with the models in FIGS. 6a, 6b and 6c, the imaging results well image the structure, stratum, depth and other information of the models, which shows that the double-dot product cross-correlation imaging condition of the embodiment in this disclosure can be applied to the elastic reverse-time migration stress imaging of complex media.

Figure 8A:
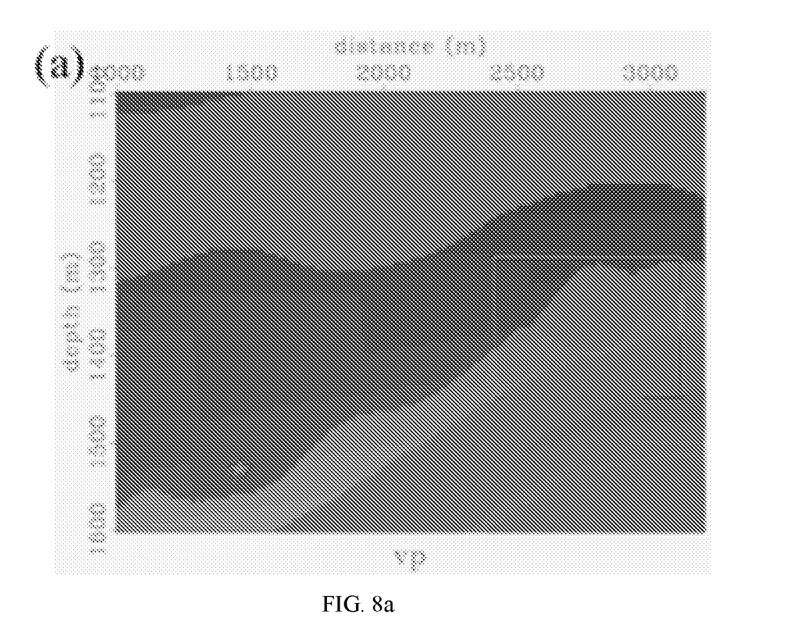
FIGS. 8*a*, 8*b* and 8*c* show respectively images obtained by enlarging the width of the Marmousi2 model in FIGS. 6*a*, 6*b* and 6*c* from 1000 m to 3200 m and the depth from 1100 m to 1600 m according to an embodiment of the present disclosure.
Figure 8B:
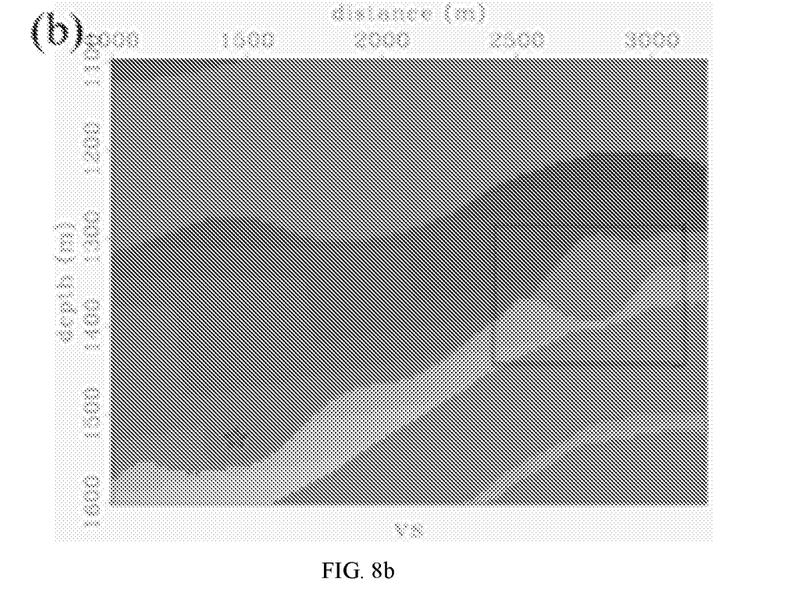
Figure 8C:
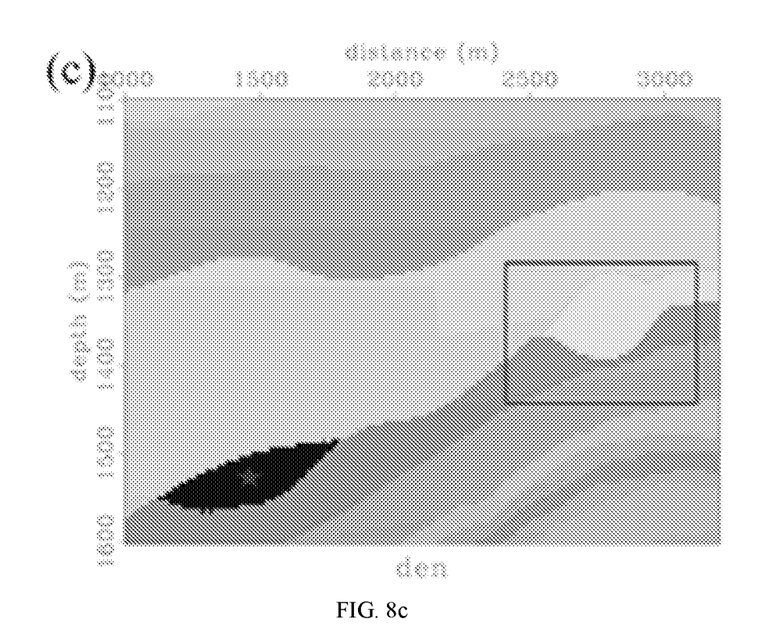
Figure 9A:
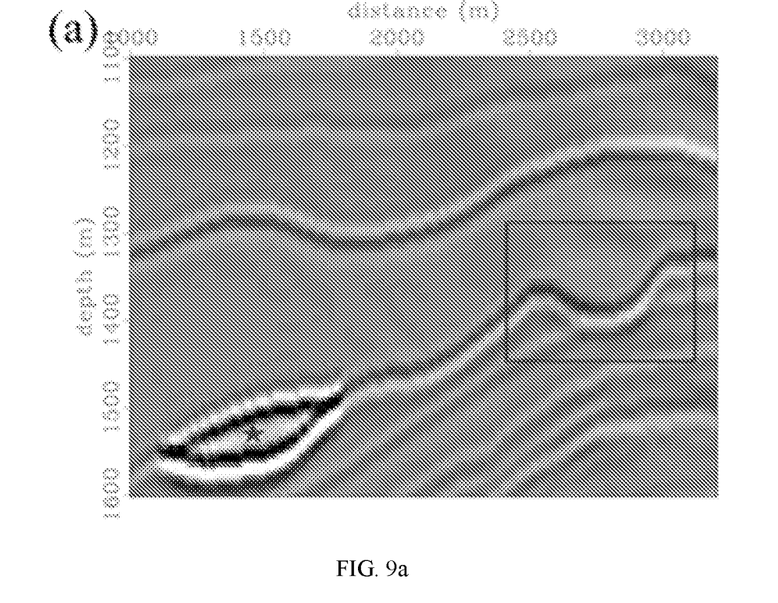
FIGS. 9*a* and 9*b* show results of offset imaging of the region shown in FIGS. 8*a* and 8*b* using the method of the embodiment of the present disclosure according to the embodiment of the present specification.
Figure 9B:
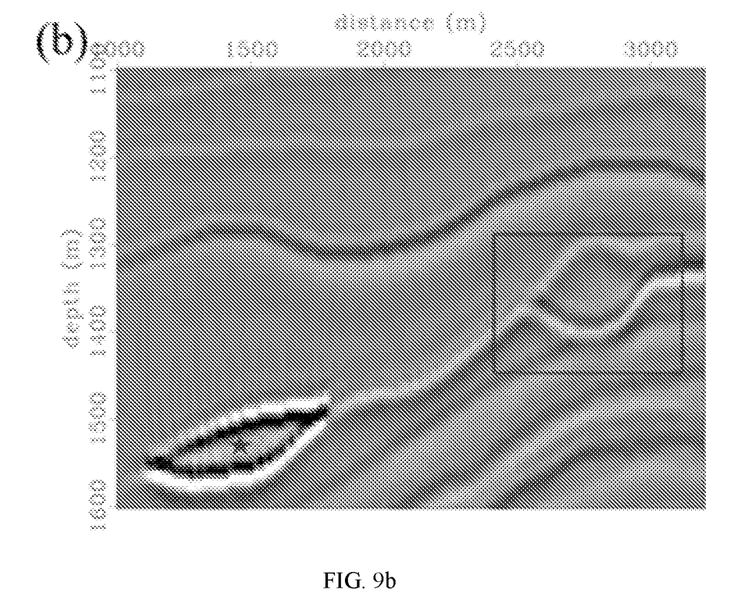

Furthermore, in order to illustrate the advantage of this method in the explanation of seismic exploration for oil and gas, the Marmousi2 model is enlarged at a width of 1000 m~3200 m and a depth of 1100 m~1600 m, as shown in FIGS. 8a, 8b and 8c, in which FIG. 8a shows the P-wave velocity model of this portion, FIG. 8b shows the S-wave velocity model of this portion, and FIG. 8c shows the density model of this portion. From the enlarged model, it can be seen that there is a special lithologic region (pentagram position) in this region, and there is no difference in P-S wave velocity and obvious difference in density in this special lithologic region. In addition, there is a "lens body" configuration in this region (box circled in FIGS. 7a and 7b). In oil and gas exploration, the lenticular structure is usually a favorable location for oil and gas accumulation, and is also one of the key targets of exploration. The enlarged portion of the imaging result is enlarged as shown in FIGS. 9a and 9b, in which FIG. 9a shows the scalar pseudo PP imaging result $I_{qPP}$ of the region, FIG. 9b shows the scalar pseudo PS imaging result $I_{qPS}$ of the region. From the imaging results in FIGS. 9a and 9b, it can be seen that very clear images are obtained at the top and bottom interfaces $I_{qPP}$ and $I_{qPS}$ of special lithologic regions (at the five-pointed star positions in FIGS. 9a and 9b). However, the imaging result at the top interface $I_{qPP}$ of the lens body are very blurred, and the outline of the top interface of the "lens body" is basically not seen (box circled in FIG. 9a), this will increase the risk of actual oil and gas exploration, and is also the traditional single-component seismic exploration problems, while in FIG. 9b, the $I_{qPS}$ imaging result provides a clear characterization of the top interface of the "lens body", which is very important for oil and gas exploration stage or subsequent interpretation, development and calculation of reserves. Therefore, the method of the embodiment of the present disclosure can be used in the joint interpretation of seismic exploration imaging, and has the potential to reduce the risk of oil and gas exploration.

Figure 10:
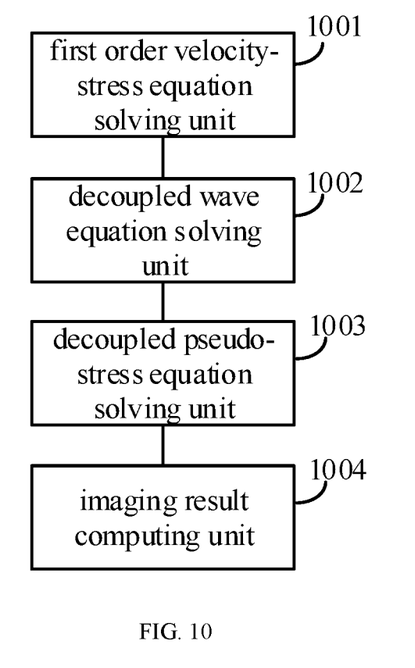
FIG. 10 is a structural schematic diagram of an elastic wave stress tensor double-dot product seismic imaging device according to an embodiment of the present specification.

Based on the same inventive concept, the embodiment of the disclosure also provides an elastic wave stress tensor double-dot product seismic imaging device, for executing the elastic wave stress tensor double-dot product seismic imaging method as described in the embodiment of the specification. Specifically, the elastic wave stress tensor double-dot product seismic imaging device of the embodiment of the present disclosure is divided into a plurality of units according to functional modules, as shown in FIG. 10, comprising:

a first order velocity-stress equation solving unit 1001, in which based on a first order velocity-stress equation of an elastic isotropic medium, medium model parameters, a function of source wavelet and multi-component seismic records are taken as inputs, to solve the first order velocity-stress equation of an elastic isotropic medium by a staggered grid high-order finite difference method, thereby obtaining a source stress tensor wavefield and a receiver particle vibration velocity vector wavefield;

a decoupled wave equation solving unit 1002 for constructing a decoupled wave equation by using the receiver particle vibration velocity vector wavefield to obtain a decoupled receiver P-wave particle vibration velocity vector wavefield and a decoupled receiver S-wave particle vibration velocity vector wavefield;

a decoupled pseudo-stress equation solving unit 1003 for constructing a decoupled pseudo-stress equation by using the decoupled receiver P-wave particle vibration velocity vector wavefield and the decoupled receiver S-wave particle vibration velocity vector wavefield to obtain a receiver decoupled pseudo-stress tensor wavefield;

an imaging result calculation unit 1004 for calculates the source stress tensor wavefield and the receiver decoupled pseudo-stress tensor wavefield by using a double-dot product cross-correlation imaging condition algorithm, to obtain a pseudo PP scalar imaging result and a pseudo PS scalar imaging result, and taking the pseudo PP scalar imaging result and the pseudo PS scalar imaging result as elastic wave stress tensor double-dot product seismic imaging results.

Since the principle of solving the problem by the above device is similar to that of the above method, the implementation of the above device can refer to the implementation of the above method, and the repeated parts will not be described again.

Figure 11:
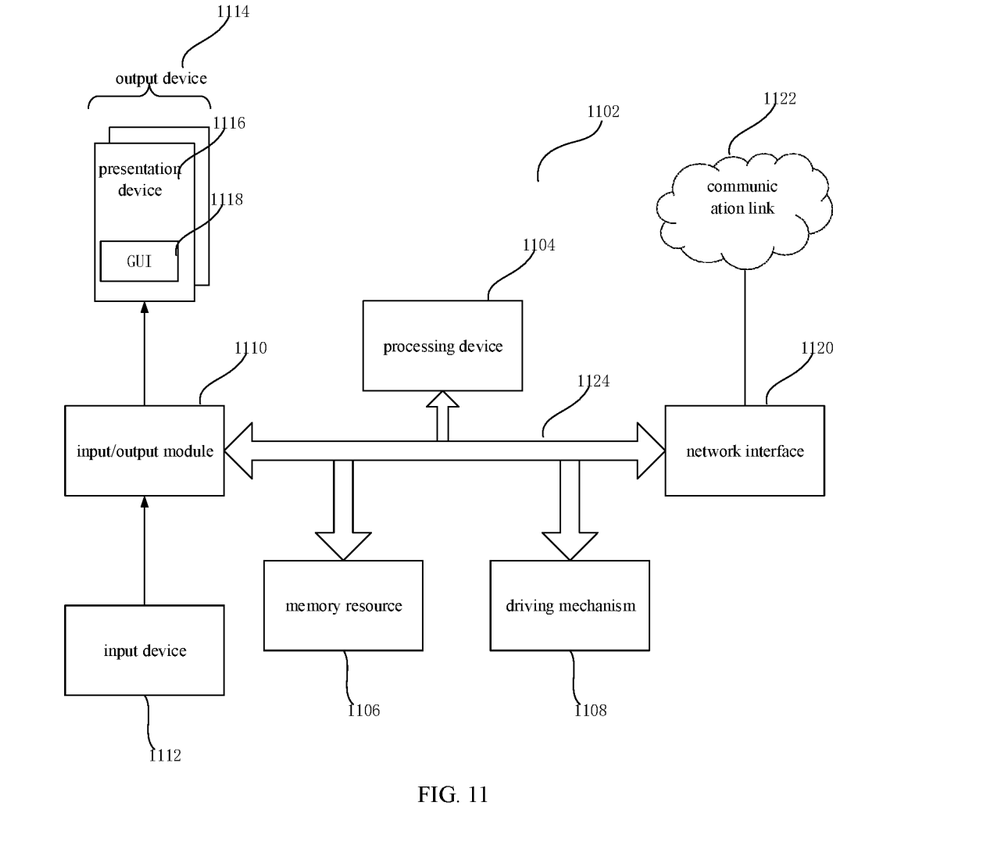
FIG. 11 is a structural schematic diagram of a computer device according to an embodiment of the present specification.

It should be noted that the above device can be applied to physical computer device, and corresponding codes are written according to the units in the device, that is, the above method is described using the codes. Specifically, FIG. 11 is a structural schematic diagram of a computer device according to an embodiment of the present specification. A processing unit (such as a CPU or the like) of the computer device in the embodiment of the present disclosure is capable of executing the method of the embodiment of the present disclosure described above. The computer device 1102 may include one or more processing devices 1104, such as one or more central processing units (CPUs), each of which may implement one or more hardware threads. The computer device 1102 may also include any memory resource 1106 for storing any kind of information, such as codes, settings, data, or the like. By way of non-limiting examples, the memory resource 1106 may include any one or more of the following: any type of RAM, any type of ROM, a flash device, a hard disk, an optical disk, or the like. More generally, any memory resource may use any technique to store information. Further, any memory resource may provide a volatile or non-volatile retention of information. Further, any memory resource may represent a stationary or removable component of the computer device 1102. In one case, when the processing device 1104 executes associated instructions stored in any memory resource or combination of the memory resources, the computer device 102 may perform any of the operations of the associated instructions. The computer device 1102 also includes one or more driving mechanisms 1108 for interacting with any memory resource, such as a hard disk driving mechanism, an optical disc driving mechanism or the like.

The computer device 1102 may also include an input/output module 1110 (I/O) for receiving various inputs (via the input device 1112) and for providing various outputs (via the output device 1114). One particular output mechanism may include a presentation device 1116 and an associated graphical user interface (GUI) 1118. In other embodiments, the input/output module 1110 (I/O), the input device 1112, and the output device 1114 may also be excluded, as just one computer device in the network. The computer device 1102 may also include one or more network interfaces 1120 for exchanging data with other devices via one or more communication links 1122. One or more communication buses 1124 couple the components described above together.

The communication link 1122 may be implemented in any manner, such as over a local area network, a wide area network (e.g., the Internet), a point-to-point connection, or the like, or any combination thereof. The communication link 1122 may include any combination of hardwired links, wireless links, routers, gateway functions, name servers, etc., governed by any protocol or combination of protocols.

Corresponding to the method in FIG. 1, the embodiment of the present disclosure further provides a computer readable storage medium which stores a computer program that, when run by a processor, executes the above steps.

The embodiment of the present disclosure further provides computer readable instructions, wherein when the instructions are executed by the processor, the program therein causes the processor to execute the method shown in FIG. 1.

It is to be understood that in the various embodiments of the present specification, the serial numbers of the processes described above do not mean a sequential order of execution, the sequence in which the processes are executed should be determined in terms of the functions and inherent logic thereof, and should not constitute any limitation to the implementation process of the embodiment of the present specification.

What is claimed is:

1. An elastic wave stress tensor double-dot product seismic imaging method, applied in a computer, comprising:
    collecting medium model parameters;
    collecting a function of source wavelet;
    collecting multi-component seismic records;
    inputting the medium model parameters, the function of source wavelet and the multi-component seismic records into a first order velocity-stress equation of an elastic isotropic medium, calculating the first order velocity-stress equation of the elastic isotropic medium by using a staggered grid high-order finite difference method to obtain a source stress tensor wavefield and a receiver particle vibration velocity vector wavefield;
    constructing a decoupled wave equation by using the receiver particle vibration velocity vector wavefield to obtain a decoupled receiver P-wave particle vibration velocity vector wavefield and a decoupled receiver S-wave particle vibration velocity vector wavefield;
    constructing a decoupled pseudo-stress equation by using the decoupled receiver P-wave particle vibration velocity vector wavefield and the decoupled receiver S-wave particle vibration velocity vector wavefield to obtain a receiver decoupled pseudo-stress tensor wavefield;
    calculating the source stress tensor wavefield and the receiver decoupled pseudo-stress tensor wavefield by using a double-dot product cross-correlation imaging condition algorithm to obtain a pseudo PP scalar imaging result and a pseudo PS scalar imaging result, and taking the pseudo PP scalar imaging result and the pseudo PS scalar imaging result as elastic wave stress tensor double-dot product seismic imaging results, and predicting the risk of oil and gas exploration based on the elastic wave stress tensor double-dot product seismic imaging results.

2. The method according to claim 1, wherein, the first order velocity-stress equation of the elastic isotropic medium is:

$$\begin{cases} \dfrac{\partial \tau_{xx}}{\partial t} = (\lambda + 2\mu)\dfrac{\partial v_x}{\partial x} + \lambda \dfrac{\partial v_z}{\partial z} \\ \dfrac{\partial \tau_{zz}}{\partial t} = \lambda \dfrac{\partial v_x}{\partial x} + (\lambda + 2\mu)\dfrac{\partial v_z}{\partial z} \\ \dfrac{\partial \tau_{xz}}{\partial t} = \mu \dfrac{\partial v_z}{\partial x} + \mu \dfrac{\partial v_x}{\partial z} \\ \rho \dfrac{\partial v_x}{\partial t} = \dfrac{\partial \tau_{xx}}{\partial x} + \dfrac{\partial \tau_{xz}}{\partial z} \\ \rho \dfrac{\partial v_z}{\partial t} = \dfrac{\partial \tau_{xz}}{\partial x} + \dfrac{\partial \tau_{zz}}{\partial z} \end{cases},$$

wherein $(\tau_{xx}, \tau_{zz}, \tau_{xz})$ denotes the source stress tensor wavefield, $(v_x, v_z)$ denotes the receiver particle vibration velocity vector wavefield, $\lambda$ and $\mu$ denote Lame's parameters, $\rho$ denotes the density, t denotes time, x and z denote x and z directions of a two-dimensional Cartesian coordinate system respectively;

the grid points of the staggered grid are defined as (1: $v_x$, 2: $\tau_{xx}, \tau_{zz}$; 3: $\tau_{xz}$; 4: $v_z$), wherein 1, 2, 3 and 4 are four different spatial positions in the cells of the staggered grid.

3. The method according to claim 2, wherein calculating the first order velocity-stress equation of the elastic isotropic medium by using a staggered grid high-order finite difference method to obtain a stress tensor wavefield and a receiver particle vibration velocity vector wavefield, further includes:

discretizing the first order velocity-stress equation of the elastic isotropic medium by using the definition of the grid points and the staggered grid high-order finite difference method to obtain a discrete scheme, the discrete scheme is given as follows:

$$v_{x\,i+\frac{1}{2},k}^{n+\frac{1}{2}} = v_{x\,i+\frac{1}{2},k}^{n-\frac{1}{2}} + \rho^{-1} \cdot \Delta t \cdot F_x \tau_{xx\,i,k}^n + \rho^{-1} \cdot \Delta t \cdot B_z \tau_{xz\,i+\frac{1}{2},k+\frac{1}{2}}^n$$

$$v_{z\,i,k+\frac{1}{2}}^{n+\frac{1}{2}} = v_{z\,i,k+\frac{1}{2}}^{n-\frac{1}{2}} + \rho^{-1} \cdot \Delta t \cdot B_x \tau_{xz\,i+\frac{1}{2},k+1\frac{1}{2}}^n + \rho^{-1} \cdot \Delta t \cdot F_x \tau_{zz\,i,k}^n$$

$$\tau_{xx\,i,k}^n = \tau_{xx\,i,k}^{n-1} + \Delta t(\lambda + 2\mu)B_x v_{x\,i+\frac{1}{2},k}^{n+\frac{1}{2}} + \Delta t \lambda B_z v_{z\,i,k+\frac{1}{2}}^{n+\frac{1}{2}}$$

$$\tau_{zz\,i,k}^n = \tau_{zz\,i,k}^{n-1} + \Delta t \cdot \lambda \cdot B_x v_{x\,i+\frac{1}{2},k}^{n+\frac{1}{2}} + \Delta t \cdot (\lambda + 2\mu)B_z v_{z\,i,k+\frac{1}{2}}^{n+\frac{1}{2}}$$

$$\tau_{xz\,i+\frac{1}{2},k+\frac{1}{2}}^n = \tau_{xz\,i+\frac{1}{2},k+\frac{1}{2}}^{n-1} + \Delta t \cdot \mu F_x v_{z\,i,k+\frac{1}{2}}^{n+\frac{1}{2}} + \Delta t \cdot \mu F_z v_{x\,i+\frac{1}{2},k}^{n+\frac{1}{2}},$$

wherein $\Delta t$ denotes time interval, i and k denote discrete points in the x and z directions in the two-dimensional Cartesian coordinate system respectively, n denotes discrete point in the direction of time t, $\rho^{-1}$ denotes the $-1$ power of the density $\rho$, $F_s(s=x,z)$ and $B_s(s=x,z)$ denote a forward difference operator and a backward difference operator in x, z directions respectively, and the specific expression is as follows:

$$F_x f_{i,k} = \dfrac{1}{\Delta x}\sum_{m=1}^{M} c_m^{(M)}[f_{i+m,k} - f_{i-m+1,k}],$$

$$B_x f_{i,k} = \dfrac{1}{\Delta x}\sum_{m=1}^{M} c_m^{(M)}[f_{i+m-1,k} - f_{i-m,k}],$$

$$F_z f_{i,k} = \dfrac{1}{\Delta z}\sum_{m=1}^{M} c_m^{(M)}[f_{i,k+m} - f_{i,k-m+1}],$$

$$B_z f_{i,k} = \dfrac{1}{\Delta z}\sum_{m=1}^{M} c_m^{(M)}[f_{i,k+m-1} - f_{i,k-m}].$$

wherein $\Delta x$ and $\Delta z$ denote sampling intervals in x and z directions respectively, $f_{i,k}$ denotes a wavefield quantity acted by difference operator, i and k denote the discrete points and are used for determining the spatial location of the wavefield quantity, $C_m^{(M)}$ denotes finite difference coefficients of the 2M-order staggered grid, 2M denotes difference order, and M denotes a positive integer;

calculating the medium model parameters by using the discrete scheme to obtain Lame's parameters and the density $\rho$;

extracting a P-wave source in the form of a Ricker wavelet during extension process of a source wavefield, loading the P-wave source on $(\tau_{xx}, \tau_{zz})$ of the stress tensor wavefield, calculating the $(\tau_{xx}, \tau_{zz})$ of the stress tensor wavefield to obtain the stress tensor wavefield $(\tau_{xx}, \tau_{zz}, \tau_{xz})$;

extracting the multi-component seismic records during extension process of the receiver wavefield, loading the multi-component seismic records on the receiver particle vibration velocity vector wavefield $(v_x, v_z)$, calculating the receiver particle vibration velocity vector wavefield $(v_x, v_z)$ to obtain the receiver particle vibration velocity vector wavefield $(v_x, v_z)$.

4. The method according to claim 3, wherein constructing the decoupled wave equation by using the receiver particle vibration velocity vector wavefield to obtain the decoupled receiver P-wave particle vibration velocity vector wavefield and the decoupled receiver S-wave particle vibration velocity vector wavefield, further includes:

the decoupled wave equation is as follows, $$\dfrac{\partial \tau^P}{\partial t} = (\lambda + 2\mu)\left(\dfrac{\partial v_x}{\partial x} + \dfrac{\partial v_z}{\partial z}\right),$$

wherein $\tau^P$ denotes the auxiliary P-wave stress;
the decoupled receiver P-wave particle vibration velocity vector wavefield is as follows, $$\begin{cases} \rho \dfrac{\partial v_x^P}{\partial t} = \dfrac{\partial \tau^P}{\partial x} \\ \rho \dfrac{\partial v_z^P}{\partial t} = \dfrac{\partial \tau^P}{\partial z} \end{cases},$$

wherein, $(v_x^P, v_z^P)$ denotes the decoupled receiver P-wave particle vibration velocity vector wavefield;

the decoupled receiver S-wave particle vibration velocity vector wavefield is as follows, $$\begin{cases} v_x^S = v_x - v_x^P \\ v_z^S = v_z - v_z^P \end{cases},$$

wherein, $(v_x^S, v_z^S)$ denotes the decoupled receiver S-wave particle vibration velocity vector wavefield.

5. The method according to claim 4, wherein, constructing the decoupled pseudo-stress equation by using the decoupled receiver P-wave particle vibration velocity vector wavefield and the decoupled receiver S-wave particle vibration velocity vector wavefield to obtain a receiver decoupled pseudo-stress tensor wavefield, further includes:

the decoupled pseudo-stress equation includes a P-wave pseudo-stress equation and a S-wave pseudo-stress equation, wherein the P-wave pseudo-stress equation is as follows:

$$\begin{cases} \dfrac{\partial \tau_{xx}^{qP}}{\partial t} = (\lambda + 2\mu)\left(\dfrac{\partial v_x^P}{\partial x} + \dfrac{\partial v_x^P}{\partial z}\right) - 2\mu\dfrac{\partial v_z^P}{\partial z} \\ \dfrac{\partial \tau_{zz}^{qP}}{\partial t} = (\lambda + 2\mu)\left(\dfrac{\partial v_x^P}{\partial x} + \dfrac{\partial v_x^P}{\partial z}\right) - 2\mu\dfrac{\partial v_x^P}{\partial x} \\ \dfrac{\partial \tau_{xz}^{qP}}{\partial t} = \mu\left(\dfrac{\partial v_x^P}{\partial z} + \dfrac{\partial v_z^P}{\partial x}\right) \end{cases}$$

wherein $(\tau_{xx}^{qP}, \tau_{zz}^{qP}, \tau_{xz}^{qP})$ denotes a P-wave pseudo stress;

the S-wave pseudo-stress equation is as follows, $$\begin{cases} \dfrac{\partial \tau_{xx}^{qS}}{\partial t} = -2\mu\dfrac{\partial v_z^S}{\partial z} \\ \dfrac{\partial \tau_{zz}^{qS}}{\partial t} = -2\mu\dfrac{\partial v_x^S}{\partial x} \\ \dfrac{\partial \tau_{xz}^{qS}}{\partial t} = \mu\left(\dfrac{\partial v_x^S}{\partial z} + \dfrac{\partial v_z^S}{\partial x}\right) \end{cases},$$

wherein $(\tau_{xx}^{qS}, \tau_{zz}^{qS}, \tau_{xz}^{qS})$ denotes a S-wave pseudo stress;

the decoupled receiver P-wave particle vibration velocity vector wavefield $(v_x^P, v_z^P)$ and the decoupled receiver S-wave particle vibration velocity vector wavefield $(v_x^S, v_z^S)$ are substituted into the P-wave pseudo-stress equation and the S-wave pseudo-stress equation respectively to obtain the receiver decoupled pseudo-stress tensor wavefield Rcv, wherein the receiver decoupled pseudo-stress tensor wavefield includes a receiver P-wave decoupled pseudo-stress tensor wavefield $Rcv^P = (\tau_{xx}^{qP}, \tau_{zz}^{qP}, \tau_{xz}^{qP})$ and a receiver S-wave decoupled pseudo-stress tensor wavefield $Rcv^S = (\tau_{xx}^{qS}, \tau_{zz}^{qS}, \tau_{xz}^{qS})$.

6. The method according to claim 5, wherein, calculating the source stress tensor wavefield and the receiver decoupled pseudo-stress tensor wavefield by using a double-dot product cross-correlation imaging condition algorithm to obtain a pseudo PP scalar imaging result and a pseudo PS scalar imaging result, further includes, calculating the source stress tensor wavefield $Src = (\tau_{xx}, \tau_{zz}, \tau_{xz})$ and the receiver decoupled pseudo-stress tensor wavefield Rcv by using a double-dot product cross-correlation imaging condition algorithm to obtain the pseudo PP scalar imaging result and the pseudo PS scalar imaging result, the formula is as follows:

$$\begin{cases} I_{qPP} = \int\limits_0^{t_{max}} \left( Src_{\sigma_{xx}}(x,t) Rcv_{\tau_{xx}^{qP}}^P(x,t) + Src_{\sigma_{zz}}(x,t) Rcv_{\tau_{zz}^{qP}}^P(x,t) + 2Src_{\sigma_{xz}}(x,t) Rcv_{\tau_{xz}^{qP}}^P(x,t) \right) dt \\ I_{qPS} = \int\limits_0^{t_{max}} \left( Src_{\sigma_{xx}}(x,t) Rcv_{\tau_{xx}^{qS}}^S(x,t) + Src_{\sigma_{zz}}(x,t) Rcv_{\tau_{zz}^{qS}}^S(x,t) + 2Src_{\sigma_{xz}}(x,t) Rcv_{\tau_{xz}^{qS}}^S(x,t) \right) dt \end{cases},$$

wherein $I_{qPP}$ denotes the pseudo PP scalar imaging result, $I_{qPS}$ denotes the pseudo PS scalar imaging result, x denotes spatial position, t denotes time; Src and Rcv denote corresponding component forms of the source stress tensor wavefield Src and the receiver decoupled pseudo-stress tensor wavefield Rcv respectively.

7. A computer device comprising a memory, a processor and a computer program stored on the memory and executable on the processor, wherein, when executing the computer program, the processor implements the method of claim 1.

8. A non-transitory computer-readable storage medium, wherein, the computer-readable storage medium stores a computer program which, when executed by a processor, implements the method of claim 1.

* * * * *